United States Patent
Tsang

[19]

[11] Patent Number: 5,961,617
[45] Date of Patent: Oct. 5, 1999

[54] SYSTEM AND TECHNIQUE FOR REDUCING POWER CONSUMED BY A DATA TRANSFER OPERATIONS DURING PERIODS OF UPDATE INACTIVITY

[75] Inventor: Siu Keun Tsang, Saratoga, Calif.

[73] Assignee: Vadem, San Jose, Calif.

[21] Appl. No.: 08/914,846

[22] Filed: Aug. 18, 1997

[51] Int. Cl.$^6$ ............................... G06F 13/00; G06F 1/32
[52] U.S. Cl. .................... 710/100; 713/320; 711/100; 345/202
[58] Field of Search ................. 395/750.01, 750.03, 395/750.05; 345/202; 712/300, 320, 323; 710/1, 18, 100; 711/100; 282/233; 340/825.06

[56] References Cited

U.S. PATENT DOCUMENTS

| | | | |
|---|---|---|---|
| 4,233,601 | 11/1980 | Hankins et al. | 345/112 |
| 5,081,450 | 1/1992 | Lucas et al. | 340/728 |
| 5,450,130 | 9/1995 | Foley | 348/391 |
| 5,493,574 | 2/1996 | McKinley | 371/40.18 |
| 5,512,921 | 4/1996 | Mital et al. | 345/202 |
| 5,524,248 | 6/1996 | Parks et al. | 395/750.06 |
| 5,589,884 | 12/1996 | Ohguchi | 348/405 |
| 5,606,428 | 2/1997 | Hanselman | 358/404 |
| 5,835,082 | 11/1998 | Perego | 345/202 |

FOREIGN PATENT DOCUMENTS

0583102A1  2/1994  European Pat. Off. ......... G09G 5/00

*Primary Examiner*—Gopal C. Ray
*Attorney, Agent, or Firm*—Flehr Hohbach Test Albritton & Herbert LLP

[57] ABSTRACT

A system and method are described that reduce display subsystem power consumption in computer systems where image data is transferred from an image memory to a display each time a new image frame is displayed. In normal operation, the computer system displays uncompressed image data, which is stored in the image memory. After a period of display inactivity, a display processor compresses the uncompressed data and writes the compressed data to another location in the image memory. In subsequent display cycles, until there is display activity, the display processor retrieves the compressed data from the memory, decompresses it in real time and then transfers the decompressed data to the display. Entire images or segments of images can be compressed in this manner. Using the compressed image data saves display power as it requires fewer memory cycles to transfer from the memory to the display than the uncompressed data. Bus bandwidth available for other, unrelated activities increases as the result of this bandwidth reduction, which benefits other system operations.

31 Claims, 7 Drawing Sheets

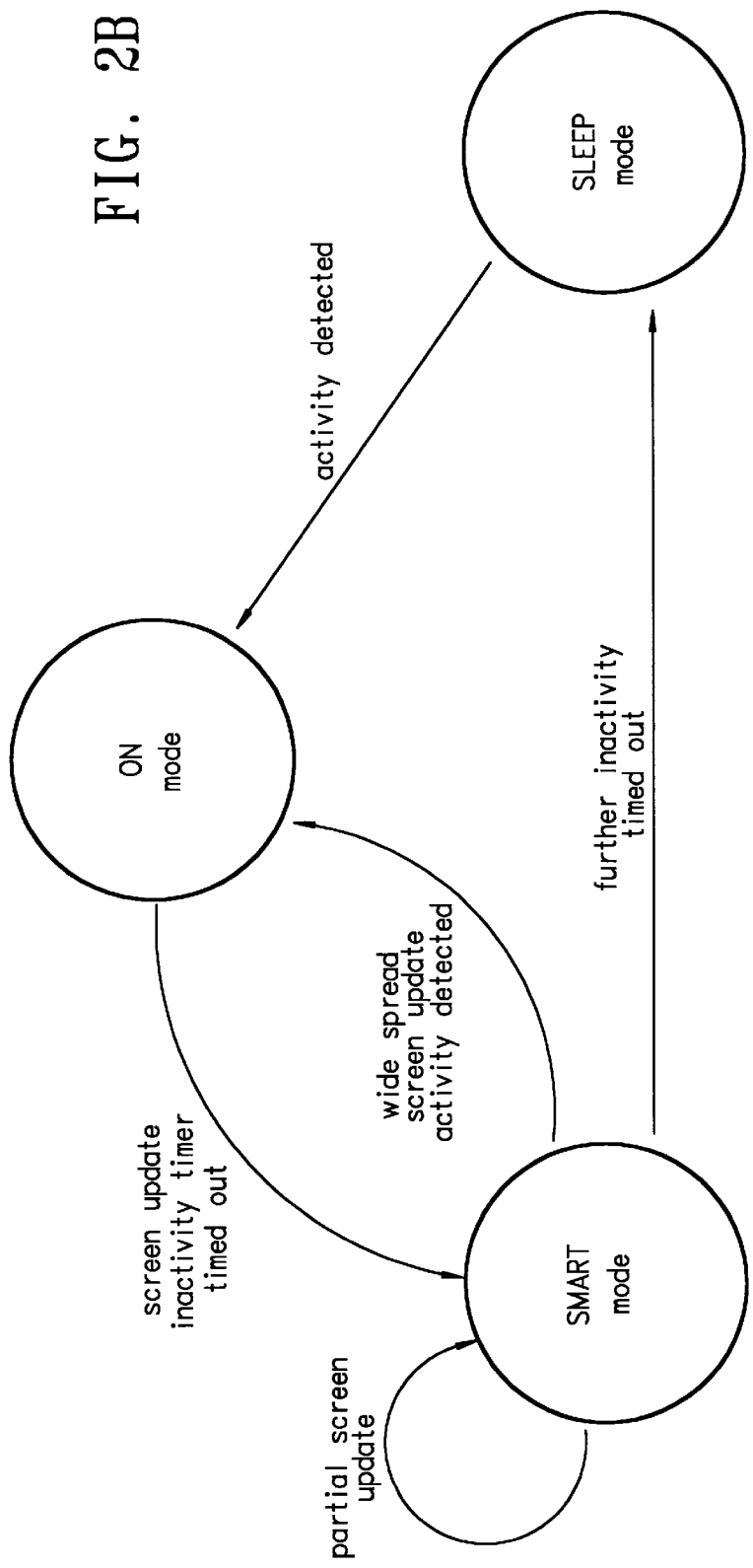

FIG. 2B

Condition Description:

ON mode — Display active, user constantly updating screen. Screen display is ON. Display data from uncompressed version.

SMART mode — No or minor screen update activity detected. Screen display is ON. Display data from either compressed or uncompressed versions. Power consumption reduced.

SLEEP mode — No screen update activity for an extended period of time. Screen display shut down. Power consumption further reduced.

SYSTEM AND TECHNIQUE FOR REDUCING POWER CONSUMED BY A DATA TRANSFER OPERATIONS DURING PERIODS OF UPDATE INACTIVITY

The present invention relates generally to power saving systems and techniques for use in microprocessor-controlled, microcontroller-based or embedded control systems, particularly those systems that regularly move data between memory and one or more processing subsystems. In particular, the present invention relates to such power saving systems and techniques that enhance overall system performance for operations in addition to memory operations.

BACKGROUND OF THE INVENTION

Many computer-based products aim to save power while providing performance that is acceptable to users. Power-saving is especially critical in handheld, portable, possibly wireless, products where battery life is a primary and essential operational issue. Achieving power savings for a given electronic product (or circuit) requires consideration of its power-using features and associated functions. Typical considerations include: the modes in which the product operates, when a function/feature is doing useful work, whether a function is required to operate continuously, whether a function can be interrupted and then resumed as needed, alternative power saving methods and inconvenience to the user of the power-controlled product.

Typical computer systems include many different functional blocks. Blocks can operate synchronously or asynchronously and can be executed periodically or on demand. Also, each functional block performs a specific task. Given these variables, different power saving techniques may be required for each individual function or operation. The effectiveness of a power saving technique depends on how well the different operating conditions are handled for the majority of the system's power-critical functions.

A common target for power savings in computers, especially portable computers, is the display subsystem, which typically is one of the most power-consuming elements of a computer. For example, in some portable systems the power consumed by the display subsystem can be as high as 80–90% of total system power. Why this is so is described below in reference to FIG. 1, which shows a block diagram of a typical display subsystem 110 for an integrated device (i.e., a computer in which memory, display and CPU functions are integrated into a single chip). Display sub-systems for other computers, where a subset of these functions are implemented on individual chips, operate in a similar manner.

As shown in FIG. 1, the display sub-system of an integrated device 110 comprises a single-chip computer 112, a memory bank 120 and a display panel 130. The single-chip computer 112 includes a CPU 114, a memory controller 118 and a display processor 116. Data (including addresses and display data 122) and memory control commands are transferred between the memory controller 118 and the memory bank 120 via a memory bus 140. Display data from the memory 120 are transferred between the memory controller 118 and the integrated display processor 116 via an internal display channel 142. Pixel data 152 (i.e., graphics signals) and display panel control signals are transferred via a display connector 150 from the display processor 116 to the display panel 130, which generates a corresponding image.

The memory 120, which could be dedicated text, graphics, or video memory or unified memory implemented in accordance with a unified memory architecture (UMA), stores the display data 124, which is used by the display processor 116 to generate the pixel data 152. Each time the display processor 116 needs to generate a new frame of pixel data 152, the memory controller 118 must retrieve the appropriate graphics data 122 from the memory 120 over the display bus 140. The display processor 116 performs a number of operations on the display data 122 to generate the pixel data 152, including: synchronizing the pixel rate of the pixel data 152 to match the display panel's horizontal and vertical scan rate, performing gray-scale or color conversion and mapping (i.e., adjusting the number of colors represented by each pixel) and modifying the data formatting (e.g., pixel resolution). The display processor 116 can also control the display panel's mode of operation by adjusting display power and backlighting to save power as necessary.

Display operations are constant and continuous once enabled. Due to the inherent nature of display media, display images are constantly updated to maintain flicker-free images at all times. To eliminate flickering effects completely, the entire image is refreshed by the display processor 116 at a rate equal to or faster than $\frac{1}{60}$th of a second (i.e., at a rate of greater than 60 frames/second). Power consumption by display sub-systems is high due to these continuous, high-frequency and memory-intensive operations. As a result, it is common for portable computers to provide a power saving option that completely disables the display when it is not in use. This option is not satisfactory when the computer is still in operation (albeit, not active use) as it prevents a user from viewing the display.

The power consumed by the display subsystem 110 for a given frame update depends on the resolution at which the update is to be performed and the number of colors in the image. This is because these factors determine the number of bits of display data 122 that must be transferred between the memory 120 and the memory controller 118 for each frame update and the number of display processor 116 cycles needed to compute the corresponding pixel data 152. For example, for a screen-resolution of 640×480 pixels displayable in 16 colors (or 4 bits per pixel), 9.216 MB of data transfer/processing is required to display an image (at 60 frames/second) for one second. Considerably more data transfer/processing (62.915 MB) is required to display an image (at 60 frames/second) for one second at a screen-resolution of 1024×1024 pixels displayable in 256 colors (or 8 bits per pixel).

These operations, especially the transfer of data over the memory bus 140 are power-intensive. Therefore, to achieve substantial power savings without turning off the display sub-system it is necessary to reduce significantly the memory cycles required to generate a display frame. Moreover, because these memory cycles consume a large percentage of the total available system bus bandwidth, reducing memory cycles also improves system performance by increasing the available system bus bandwidth for other system activities. The exact bandwidth improvement due to reducing memory cycles depends on the display resolution and the number of displayable colors.

Many prior art display processors have adopted a solution to reduce these memory cycles wherein the display data 122 stored in the memory 120 is compressed. In these systems the compressed data is used to generate a corresponding frame of graphics data. This eliminates the need to transfer repeatedly over the memory bus 140 the uncompressed data from which the compressed data 122 was generated. Depending on the compression rate (i.e., the ratio by which the compressed data 122 is smaller than the corresponding uncompressed data), large amounts of power can be saved by this technique. Problems with this technique include: (1) the need to rapidly compress the data so that it is available for immediate use and (2) the fact that the compression must be lossless or near-lossless so that a user viewing the display is not unduly inconvenienced. Moreover, these techniques are not sensitive to the manner in which the computer associated with the display is being used. For example, they do distinguish between when the system is in active use or when it is standing-by for user input, which is a state in which computers spend much of their time.

SUMMARY OF THE INVENTION

The present invention describes apparatuses and techniques for reducing power consumed by data transfer operations during periods of system inactivity.

In particular, the present invention is a power-saving data interface system that includes a processing unit and an image memory. The processing unit is configured to receive input data from the memory and generate from the received input data corresponding output data. Uncompressed and compressed versions of the input data are stored in the memory. When the input data has not been recently updated, the processing unit generates the compressed version from the uncompressed version and then uses the compressed version to generate the output data. When the input data has been recently updated, the processing unit uses at least a subset of the uncompressed version to generate the output data.

A preferred processing unit includes a decompressor implemented in hardware that generates the output data from the compressed version. Data compression can be performed by the processing unit in either software or hardware. The hardware implementation is preferred as it can eliminate all memory cycles needed by the CPU in the software implementation to compress each frame of incoming display data.

The present invention includes an activity monitor that determines whether the input data has been recently updated and whether the input data should be compressed. Based on information from the activity monitor, the processing unit generates the output data from an appropriate combination of the input data versions. The processing unit can operate in two modes.

In a first mode, when any part of the input data is updated, the processing unit generates the output data using the uncompressed version in its entirety. In a second mode, the compressed version is structured so that distinct regions of the input data are represented in the compressed version by respective compressed regions. Then, when one or more of the distinct regions are updated, the processing unit generates the output data using the uncompressed regions that correspond to the updated distinct regions and the compressed regions that correspond to the distinct regions that were not updated.

In a preferred embodiment, the input data is transferred between the memory and the processing unit over a bus. In this system, transferring the compressed version over the bus dissipates less power than transferring the uncompressed version over the bus.

The processing unit, memory and bus can be deployed within a computer system with limited power reserves (e.g., a handheld, portable or battery-powered system). In such a system the power savings provided by the present invention would substantially increase battery life and/or system performance. In any of the embodiments, the input data can be display data, in which case the processing unit performs graphical display operations and the output data is graphics data. The input data can also be any other type of data associated with repetitive and continuous data operations.

BRIEF DESCRIPTION OF THE DRAWINGS

Additional objects and features of the invention will be more readily apparent from the following detailed description and appended claims when taken in conjunction with the drawings, in which:

Referring to FIG. 2B, there is shown a simplified state diagram depicting these states and the transitions between the states.

DESCRIPTION OF THE PREFERRED EMBODIMENT

Figure 2A:
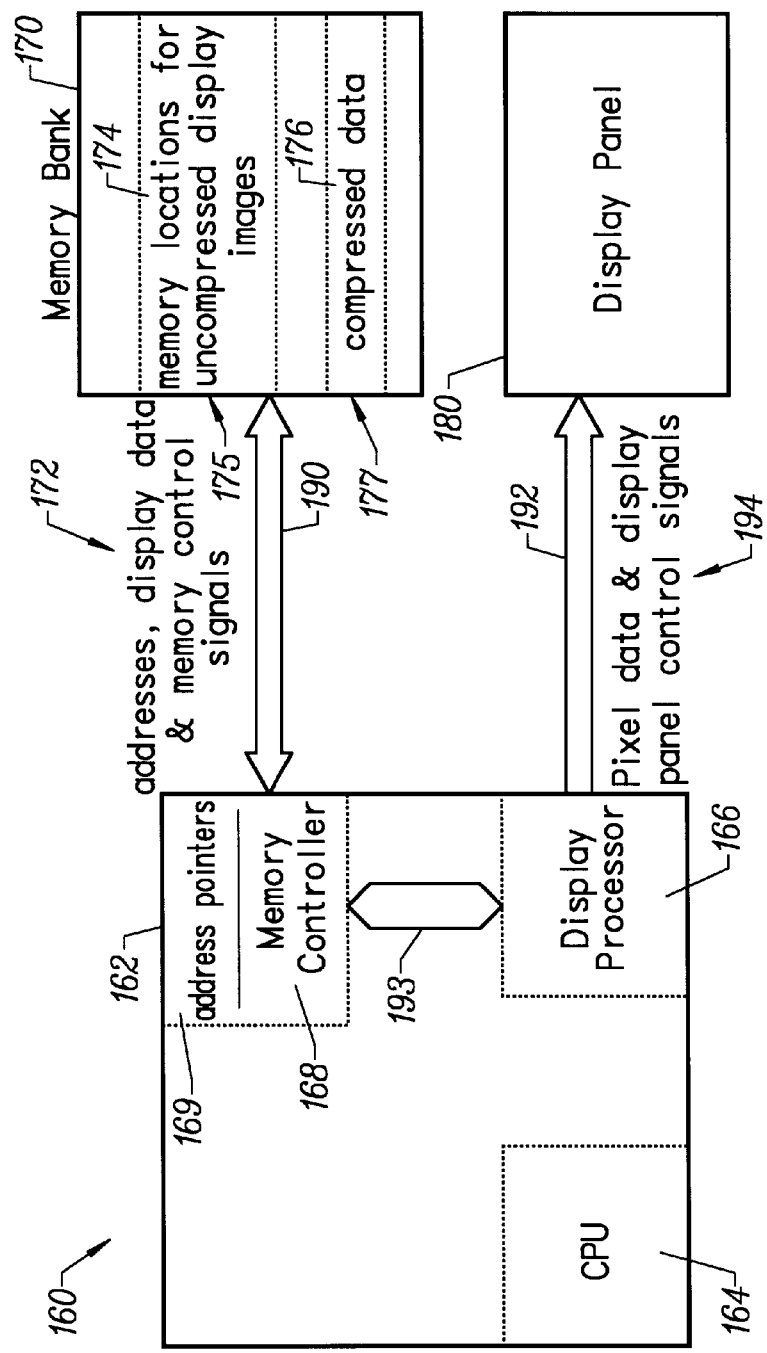
FIG. 2A is a block diagram of a preferred embodiment of a computer system employing the techniques of the present invention.

Referring to FIG. 2A, there is shown a block diagram of a preferred embodiment 160 that reduces display power consumption for situations where display updates are not performed at a high frequency. The preferred embodiment does not reduce display quality for display updates performed at a high frequency. The preferred embodiment 160 includes a single-chip computer 162, a memory bank 170 (internal or external to the chip 162) and a display panel 180. The single-chip computer 162 includes a CPU 164, a memory controller 166 and a display processor 168 modified in accordance with the present invention.

Figure 1:
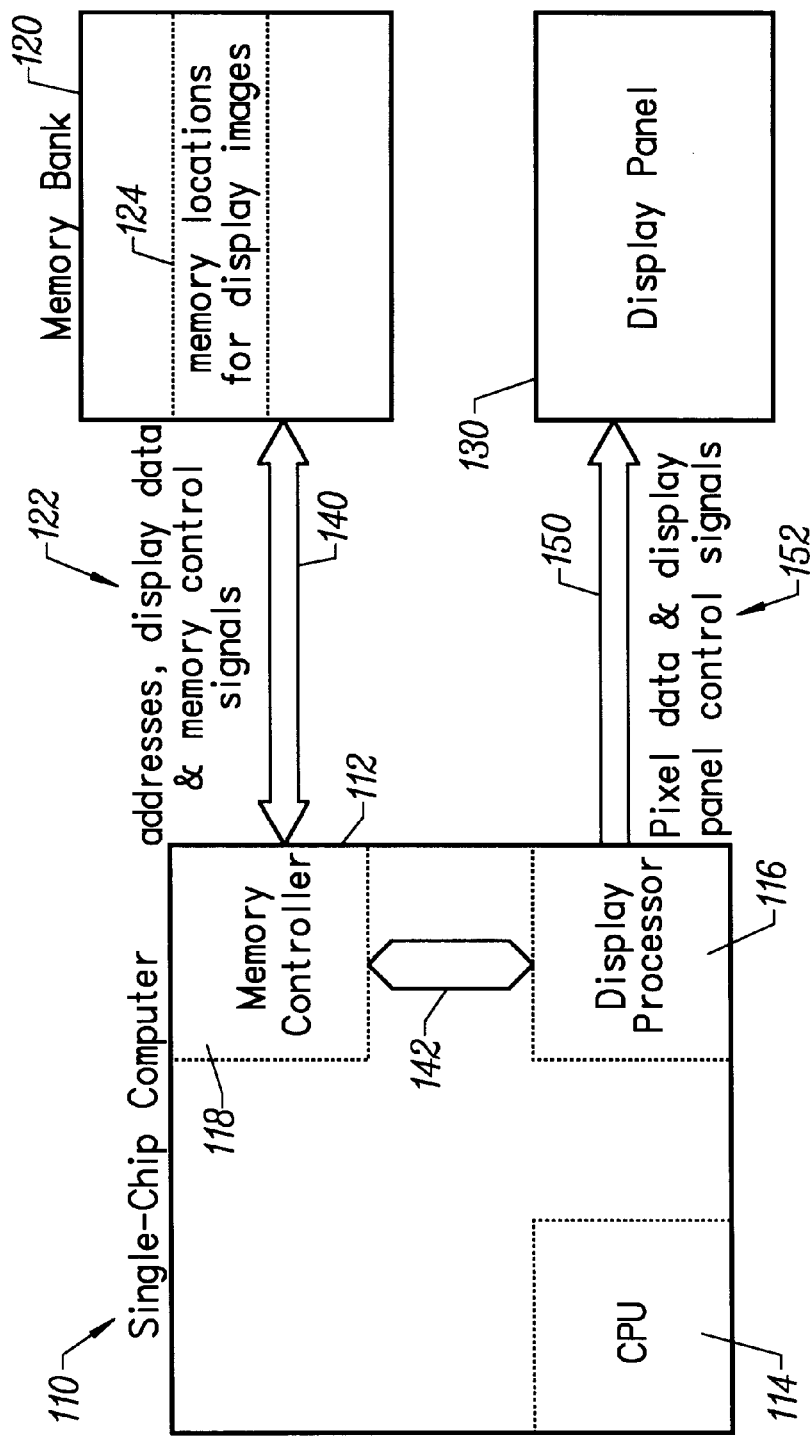
FIG. 1 is a block diagram of a prior art display subsystem.

As in the conventional system of FIG. 1, data (including addresses and image data 172) and memory control commands are transferred between the memory controller 168 and the memory bank 170 via a memory bus 190. Display data from the memory 170 are transferred between the memory controller 168 and the integrated display processor 166 via an internal display channel 193. Pixel data 194 (i.e., graphics signals) and display panel control signals are transferred via a display connector 192 between the display processor 166 and the display panel 180, which generates a corresponding image. The techniques of the present invention are also applicable to designs where the CPU and the display processor are not in the same chip.

In contrast to conventional display processors, the image data 172 is stored in the memory bank 170 in uncompressed and compressed versions 174, 176. Each unit of uncompressed image data 174i (where i denotes a separately addressable region of the uncompressed image data 174) is identical in size and content to corresponding image data 172i transferred over the memory bus 170 (for the purposes of the present application, a "unit" of image data is understood to be an entire image frame or any portion thereof).

The uncompressed data 174*i* is available in real-time (i.e., at the frame rate). Each unit of the compressed image data 176*j* (where j denotes a separately addressable region of the uncompressed image data 174) is a compressed version of a corresponding unit of the uncompressed image data 174*i*. A given unit of uncompressed image data 176*j* is smaller and, possibly (depending on the compression technique employed), of lesser quality, than the corresponding data 174*i*. Preferably, the display processor 166 performs the compression in hardware, enabling a unit of compressed data 176*j* to become available shortly (e.g., tens of milliseconds) after the corresponding uncompressed image data 176*i* is input for compressing. Alternatively, the data compression operation can be performed in software.

It is now described how the present invention employs the compressed data 176 to conserve display power while improving system performance.

It is well-known that computer systems spend a large portion of their active time awaiting user inputs. Battery life can be increased significantly if substantial power can be saved during these waiting periods. In such a waiting period the same image is repeatedly painted on the display 180. The present invention seeks to reduce the power consumed by these repeated updates by providing a "SMART" mode in which the displayed image is still regularly updated, but with a lower power expenditure per update. The system 160 enters the SMART mode whenever it detects a short period of display inactivity. The detection period can be set adaptively, by users, by application programs, or to a default period.

Once in the SMART mode, the display processor 166 generates a compressed version 176*j* of on-screen image unit from the uncompressed image data 174*i* and stores the compressed data 176*j* at an address 177*j* in the memory 170. As soon as the compressed image data 176*j* becomes available, and assuming that the displayed image has not changed, the display processor 166 issues a command to the memory controller 168 to change its image address pointers (the address in the memory 170 from which the image data is retrieved) to the address 177*j*. Subsequently, for as long as the system remains in the SMART mode, the memory controller 168 uses the compressed data 176*j* for image updates instead of the uncompressed data 174*i*. The size of the compressed data 176*j* is usually far smaller than the size of the uncompressed data 174*i*. Consequently, transferring the compressed data 176*j* over the memory bus 172 reduces memory cycles and power consumption. Greater power savings are realized when the memory 170 is internal to the single chip computer 162.

Preferably, no intervention of the CPU is required to trigger the transition to the SMART mode. In the preferred embodiment, this task is performed by activity monitoring circuitry within the display processor 166, described in reference to FIG. 3, that monitors the display data to determine whether the data has been updated during a defined monitoring time. If the data has not been updated, the display processor 166 compresses all or a portion of the uncompressed display data, checks once again for a display data update, and, if no update has occurred, enters the SMART mode.

While the system 160 is in the SMART mode, the display processor 166 decompresses the compressed data 176*i* in real time and transfers the resulting decompressed data 194 to the display panel as in a conventional image update. In the preferred embodiment, the image decompression is performed in hardware within the display processor 166 to provide the necessary compression speed. In addition to data compression, the display processor 166 also performs time adjustments on the stream of pixel data 194 to account for different amounts of time spent decompressing the compressed image data and to provide a constant and continuous flow of image data to the display panel 180.

The system 160 transitions out of the SMART mode into an ON mode whenever screen update activity, such as a key stroke, mouse movement or other qualified input by a user, or display changes initiated by software, is detected. Note that it is possible that some sections of the display 180 stay in SMART mode while others are in ON mode. This is possible when screen update activity affects only a subset of the screen sections, in which case the entire system 160 does not transition into the ON mode. If update activity affects the entire screen, then the system 160 is completely in the ON mode. Upon exiting the SMART mode the memory controller 168 resets its address pointers 169 to the address 175*i* of the uncompressed image data 174. Simultaneously, any compression operation that is in progress is immediately aborted, which conserves power. The system 160 also has a SLEEP mode in which the entire display system is deactivated. The system 160 can transition to the SLEEP mode from either the ON or SMART modes when no activity has occurred for a sufficiently long period of time. The system can transition from the SLEEP mode to the ON mode when activity is detected, but cannot directly transition to the SMART mode.

Assuming that memory is external and that the compression operation reduces the size of the image data by fifty percent (50%), from which it follows that the number of memory cycles required for an image update in SMART mode is half the number required in normal system operation. For example, in a 32-bit system, displaying a 640×480 resolution image at 60 frames per second in 16 colors in SMART mode saves 1,152,000 memory cycles per second. For example, given that each memory cycle consumes 10 nanoamps, the resulting current savings per second is 11.5 mA, which equates to a power savings of 38 mW per one second of SMART operation. For a 1024×1024 resolution image displayable in 256 colors, 7,864,320 memory cycles are saved in one second, which equates to 78.5 mA or 269.5 mW saved in one second. Additional savings would be achieved if the memory 170 were internal. Referring to FIG. 2B, there is shown a simplified state diagram depicting these states and the transitions between the states.

Figure 3:
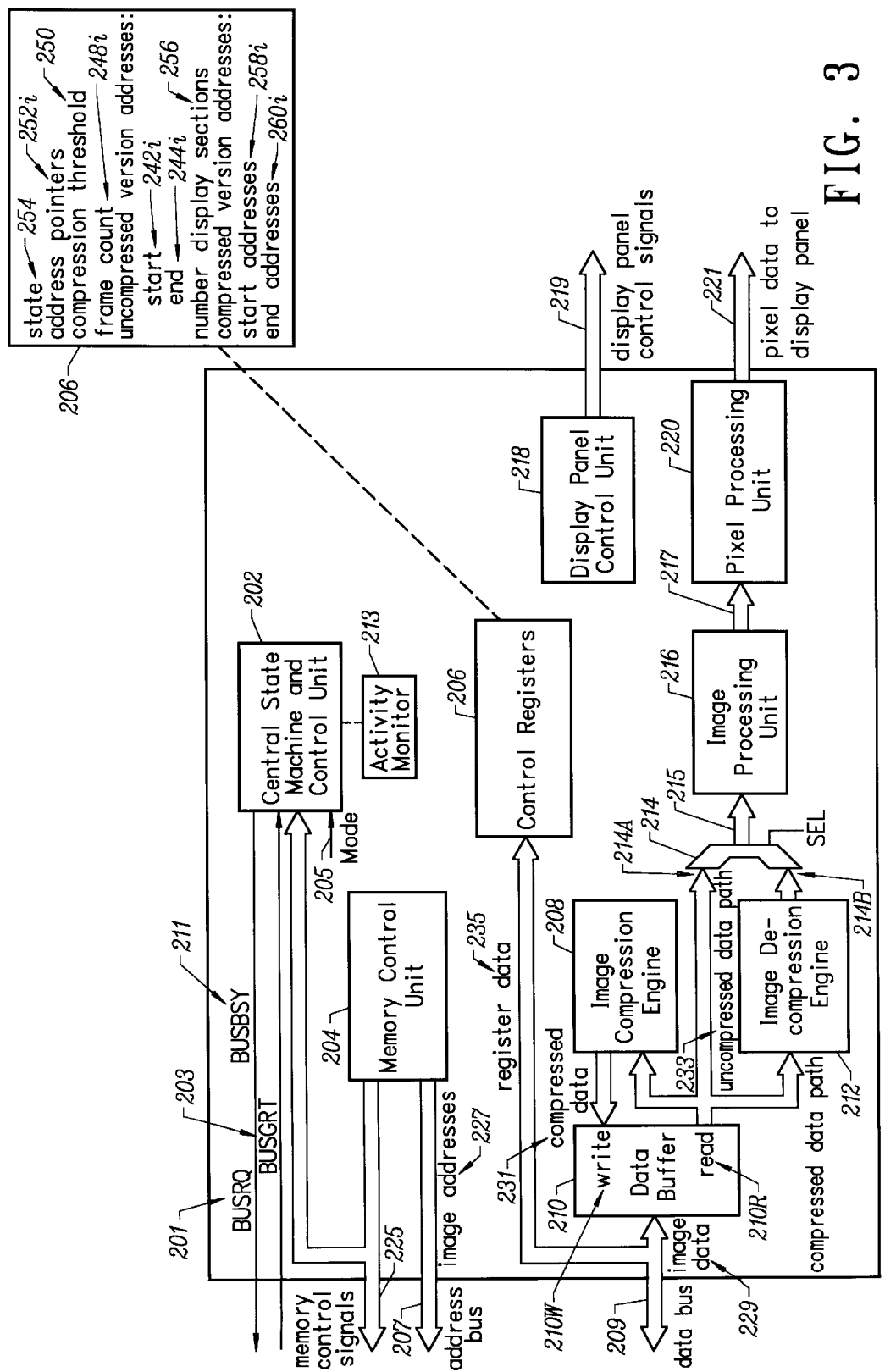
FIG. 3 is a block diagram of a preferred embodiment of the display processor from FIG. 2A.

Referring to FIG. 3, there is shown a block diagram of a display processor 200 in which the present invention is implemented. The display processor 200 includes a central state machine and control unit (hereinafter referred to as "the controller") 202 that incorporates an activity monitor 213, a memory control unit 204, control registers 206, an image compression engine 208, a data buffer 210, an image decompression engine 212, a multiplexer 214, an image processing unit 216, a display panel control unit 218 and a pixel processing unit 220. External signals coupled to the display processor include a bus request output signal (BUSREQ) 201, a bus grant input signal (BUSGRT) 203, a bus busy signal (BUSBSY) 211, memory control signals 225, or equivalent control signals, image addresses 227 (provided on an address bus 207), image data 229 and register data 235 (both provided a data bus 209). This set of external signals comprises the signals transferred between the display processor 166 and the memory controller 168 of FIG. 2A. External signals transferred between the display processor 166 and the display panel 180 over the data bus 194 (FIG. 2A) include a display panel control signal 219 and pixel data 221. A mode signal 205 provided by the display processor 166 indicates the system mode (ON, SMART or OFF).

In the preferred embodiment, the mode signal 205 is internal and embodies information from one or more sets of dedicated state bits 254 in the control registers 206. Each set of dedicated state bits 254 indicates whether a corresponding display section is in the ON, SMART, or OFF mode. The state information 254 can be read or written by the CPU 164 and can be read by software.

The controller 202 controls the operations of the other elements of the display processor 200 in response to the value of the mode signal 205. When the system is in the SLEEP mode the display processor 200 is disabled. When the system is in the ON mode the processor 200 performs the steps for processing uncompressed image data 174. When the system is in the SMART mode, the processor 200 performs the steps for processing compressed image data 176. The controller 202 receives memory status information via the memory control signals 225 from the memory controller 168 (FIG. 2A) that indicates whether the memory 170 is able to respond to read and write requests. Only when the memory 170 is responsive does the controller 202 enable operation of the memory control unit 204.

The controller 202 controls the other elements of the display processor via the control registers 206, which store the information shown in Table 1.

TABLE 1

| INFORMATION | DESCRIPTION |
| --- | --- |
| system state 254 | ON, SLEEP, SMART or OFF |
| address pointers 252i | pointers used to access the memory 170 for the uncompressed and compressed versions 174, 176 |
| frame inactivity threshold 250 | the number of frames without update activity before compression activity is triggered by the display processor 200; |
| frame count 248 | the number of frames over which the image (or image segments) has not changed; |
| display start address 242 for uncompressed version | screen start address of uncompressed display data in the memory 170 |
| display end address 244 for uncompressed version | screen end address of uncompressed display data in the memory 170 |
| number of display sections 256 | number of sections of the display 256, each corresponding to at least one block of the display data in the memory 170 |
| display start addresses 258i for compressed versions | screen start addresses of compressed display data in the memory 170 |
| display end addresses 260i for compressed versions | screen end addresses of compressed display data in the memory 170 |

The memory control unit 204 directly interacts with the memory controller 168 (FIG. 2A) to coordinate the transfer of the image data between the memory 170 and the data buffer 210. The operation of the memory control unit 204 is conventional in that it supplies control signals 225 indicating required memory operations to be performed by the memory controller 162 and addresses 227 on the address bus 207 indicating the locations of the image data that it needs transferred to/from the memory 170. One unconventional aspect of the memory control unit 204 is that, upon the switch from the ON to the SMART mode and vice-versa the address, pointers for a given image unit are switched between the address 175i of the uncompressed data 174i for that image unit and the address 177j of the corresponding compressed data 176i. The addresses 175i, 177j correspond to respective start addresses 242 from the control registers 206.

Upon initial startup of the computer 160 (FIG. 2A), the computer's operating system or display driver programs the display processor 200 and the control registers 206 with all of the information needed for operation of the present invention. The memory controller 168 generally services the CPU 164 (FIG. 2A) or co-processors other than the display processor 200. The display processor 200 has its own dedicated memory controller 204, which handles display memory operations. To initiate a memory cycle the memory control unit 204 issues a BUSRQ signal 201 to request the memory bus. The memory controller 168 (FIG. 2A) grants access to the bus by issuing a BUSGRT signal 203 to the display processor 200. The memory control unit 204 can then initiate the necessary memory cycles. While generating memory cycles the memory control unit 204 activates the BUSBSY signal 211. Upon completing a memory operation, the memory control unit 204 deactivates the BUSBSY signal, which returns control to the memory controller 168.

Image data transferred from the memory bank 170 over the data bus 209 is temporarily stored in the data buffer 210 as is data to be transferred back to the memory bank from the display processor 200. The data buffer is used to reduce cycle overhead. Burst cycles can be used if more than one level of data buffer is available. Preferably, the data buffer 210 is large enough to hold a complete frame of compressed, high quality image data (e.g., a 1024×768 pixel image with 16 color bits per pixel). If this can be achieved, no external memory write and read cycles will be required to maintain the image on the screen, resulting in the greatest possible power savings. The data buffer 210 has a write port 210W that is coupled to the output of the image compression engine 208 and a read port 210R that is coupled to the inputs of the image compression and decompression engines 208, 212 and one input 214A of the two-input multiplexer 214. The other input 214B of the multiplexer 214 is coupled to the output of the image decompression engine 208. The multiplexer couples one of its inputs to the output 215 on the basis of a select signal SEL. The output 215 is coupled to the input of the image processing unit 216, whose output is coupled to the pixel processing unit. The pixel processing units output 221 forms the pixel data stream that is coupled to the display panel.

The data buffer 210, image compression and decompression engines 208, 212 and the multiplexer are employed differently depending on whether the system mode is ON or SMART and, if the system is in the SMART mode, whether the display processor is in a compression or decompression mode.

When the display processor 200 is in compression mode (i.e., at the very beginning of the SMART mode) the image compression engine receives buffered image data from the read port 210R, compresses the data, and outputs the compressed data to the write port 210W of the data buffer, which stores the data. Subsequently, the newly compressed and buffered data is output on the data bus 209 and written to the designated address locations in the memory 170 after the BUSGRT signal 203 is received. This entire step can be avoided if there is an integrated buffer on-chip that is large enough to hold all of the compressed data.

When the display processor 200 is in decompression mode (i.e., sometime while the system is still in the SMART mode but after compression is completed), the compressed data 176j is transferred from the address 177j by the control unit 204 and written to the data buffer 210. The compressed data is then input at the read port 210R by the image decompression engine 212, which decompresses the data in real time and outputs the decompressed data to the input 214B of the multiplexer 214. The multiplexer select signal SEL is set so that the decompressed data is coupled to its output 215. The subsequent processing of the output 215 by the image processing unit 216 and the pixel processing unit 221 is the same for decompressed data 176 (during SMART mode) or uncompressed data 174 (during ON mode).

When the display processor is in the ON mode the data buffer stores the uncompressed image data 174 on the data bus 209 and outputs the uncompressed data at the read port 233 to the multiplexer input 214A. The SEL signal is set so the uncompressed data is coupled to the input of the image processing unit 216 from the input 214A of the multiplexer 214. Subsequent processing by the image processing unit 216 and the pixel processing unit 220, as well as the control of the display 180 (FIG. 2A) is now described.

The image processing unit 216, pixel processing unit 220 and display panel control unit 218 are conventional in operation. The image processing unit 216 converts the image data from the multiplexer 214 to actual pixel data depending on the current display mode (e.g., SVGA with 24 bits per pixel, SVGA with 16 bits per pixel, VGA with 16 bits per pixel, VGA with 1 bit per pixel, etc.). This operation is necessary as image data from memory typically corresponds to a representation of an image, not actual pixel data for the image. The pixel processing unit 220 translates the pixel data 217 from the image processing unit 216 into a pixel stream 219 wherein pixels are transferred to the display at a specified rate and format. The display panel control unit 218 issues display panel control signals 219, including all synchronization (sync) timing signals required by the display 180. This power saving operation is not restricted to designs utilizing LCD panels, but can also be applied to CRT designs or other types displays. Among other things, the display control can power the display panel ON or OFF upon transitions to the ON mode or SLEEP mode, respectively.

Figure 4:
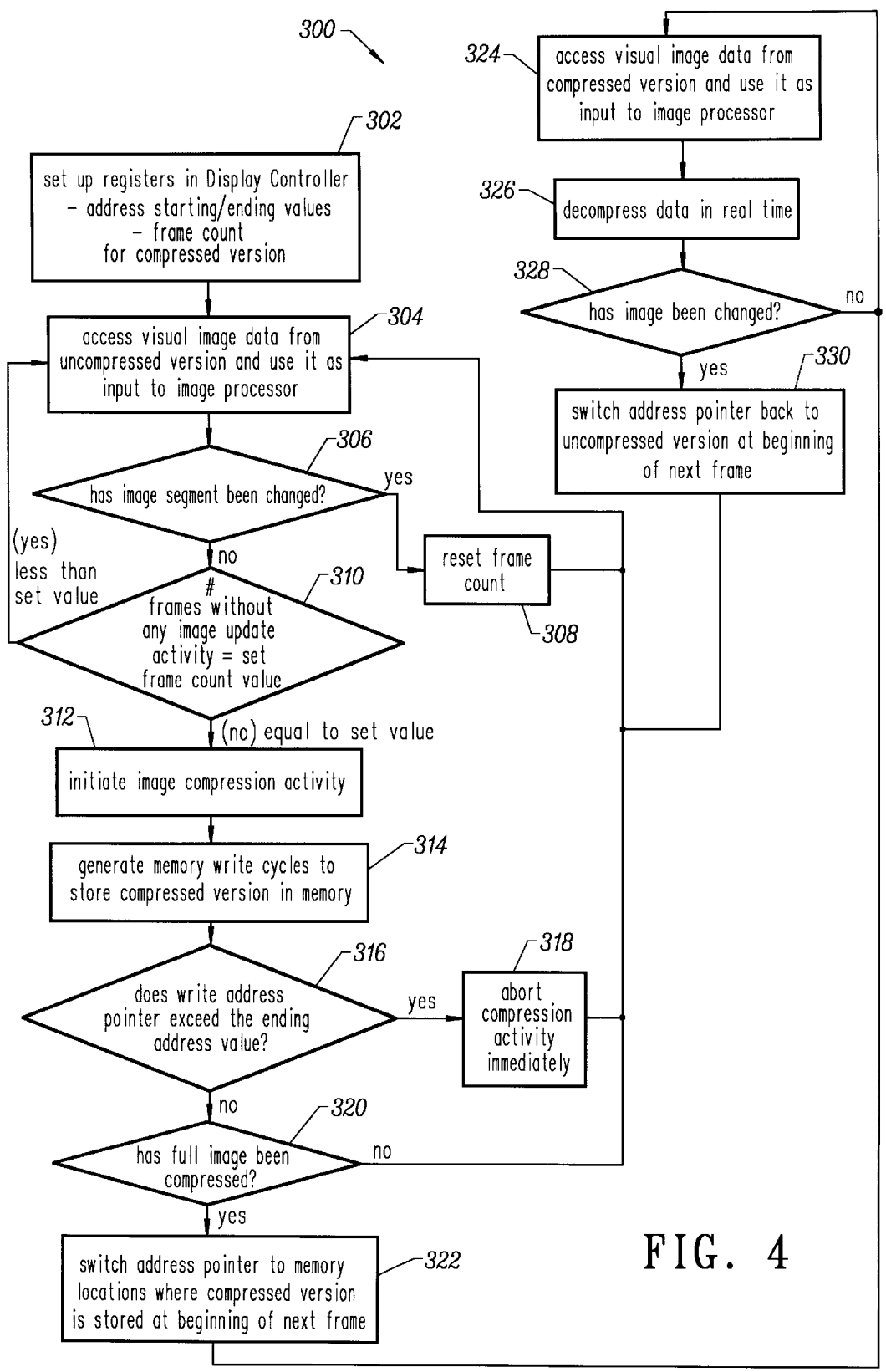
FIG. 4 is a flow chart showing the steps performed by the present invention in determining whether and how to employ compressed image data as opposed to uncompressed image data.

Referring to FIG. 4, there is shown a flowchart 300 of the steps performed by the controller 202 to control the operations of the display processor 200. This flowchart assumes that the initial system mode is ON. As the first step (step 302) the controller 202 sets up the control registers 206, including starting and ending address values 242, 244, 258, 260 of the image data in the memory 170 and a frame count 248. The frame count 248 is used to set up the triggering condition for SMART mode operation to begin. Next (304), the controller 202 accesses the visual image data 174 from the uncompressed version, which is passed to the image processor 216 (FIG. 3) to be displayed. The central state machine and control unit 202 has built-in activity monitoring circuitry 213 (FIG. 3) to determine whether the image has been changed (306) from the prior frame. If the image has been changed (306-yes), the controller 202 resets the frame count value 248 stored in the control registers (308) and returns to step (304) to access the new uncompressed image data 174. If the image has not been changed (306-no), the controller 202 tests whether the number of frames without an update is still below the frame inactivity threshold value 250 (310).

If the test is true (310-yes), the controller 202 returns to step (304) to once again access the uncompressed image data 174 (which is identical to the image data used for the previous update).

If the test is false (310-no), the controller 202 initiates image compression activity (312) and generates the memory write cycles to store the compressed version in the memory as compressed image data 176 (314). For the first memory cycle the controller 202 specifies that the data is to be written to one of the start addresses 258a (where "a" is a variable).

As the image data is compressed, the controller 202 tests whether the write address in the memory 170 exceeds the corresponding end address 260a (316). If the write address exceeds the end address 260a (316-yes), the controller 202 immediately aborts the compression activity (318) and returns to step (304). Otherwise (316-no), the controller 202 continues compressing the image data 174. During compression, if the input address reaches the end address 244 for the uncompressed version and the output address value has not exceeded the end address 260 allowed for the compressed version, compression is successfully completed. This condition triggers the central state machine and control unit 202 to switch address pointers 252 to the compressed version instead of the uncompressd version in the next frame.

The above method, which uses ending address values, is only one implementation of the many methods that be used to control the compression operation. Other methods, such as one that employs memory block size calculation and compare steps, can achieve the same result.

In the preferred embodiment, the difference between respective start and end addresses 258, 260 is set by the controller 202 to be substantially smaller than the size of an uncompressed image 242, 244. Generally, the difference in sizes is selected so that the power savings involved in using the compressed image more than compensates for the additional power consumed in compressing the image data and transferring the compressed data to the memory 170.

If, through the end of compression, the write address does not exceed the end address 260 (316-no), the controller 202 tests whether the entire image (or sections thereof) was compressed (320). If not (320-no), the controller 202 returns to step (304). If the entire image (or sections thereof) was compressed (320-yes), the controller switches the address pointer(s) 252 to the start address(es) of the compressed data 176 at the beginning of the next frame update (322) accordingly.

Subsequently, the compressed image data 176 is accessed from the memory 170 and input to the data buffer 210 as described in reference to FIG. 3 (324). The buffered, compressed data is then decompressed in real time (326) and displayed. Once again, the controller 202 tests whether the image has been changed (328). If not (328-no), the next frame is also generated from the compressed data 176 (324). If the image has been changed (328-yes) the next frame is generated from the uncompressed data 174 (304).

Figure 5:
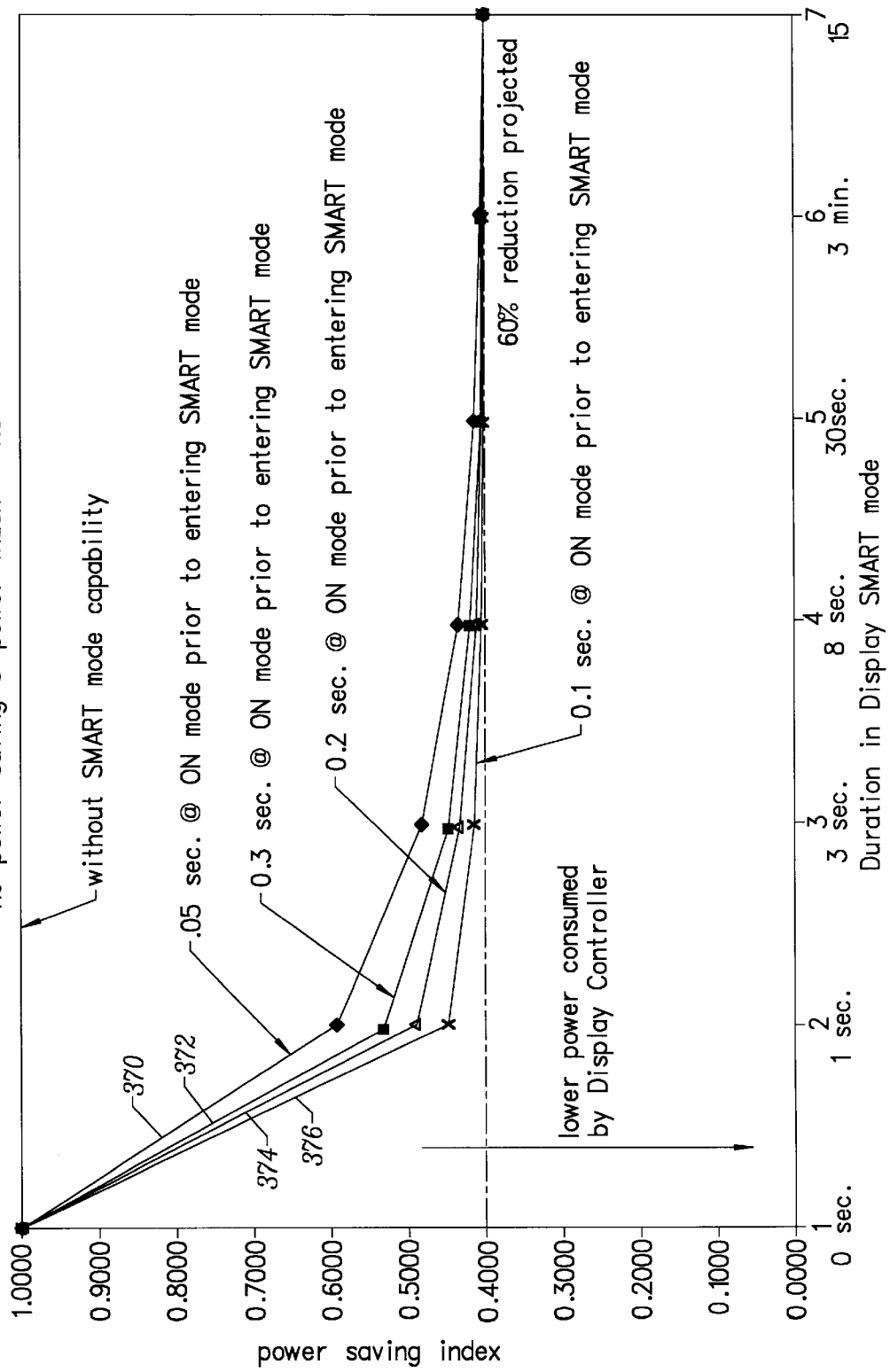
FIG. 5 is a plot of power saving index versus duration in the display smart mode (i.e., the SMART mode) for the present invention.

Referring to FIG. 5, there is shown a plot of power saving index (power saving index=1 equates to no power saving; power saving index=0 equates to 100% power saving) versus duration (seconds) in the display SMART mode for different detection periods (i.e., the period of time that must pass before the system can be switched to SMART mode operation). In particular, the plots 370, 372, 374, 376 correspond to detection periods of 0.5, 0.3, 0.2 and 0.1 seconds respectively. Note that the projected power savings for each of the detection periods converges to 60 percent (corresponding to a power saving index of 0.4) for long durations. For shorter periods, the power savings are more favorable for the shorter detection periods. Note that for even very short durations (on the order of one second), the present invention achieves no worse than 40% power savings.

As mentioned above, the power saving techniques of the present invention are applicable to entire images or parts thereof. That is, the present invention can compress only those parts of a screen image that have not been updated while using uncompressed image data for the portions that have been updated. This mode of operation is useful for the common situation where a small portion of the screen continues to be updated while the system awaits a user input. An example of this situation is where a strip at the bottom of a substantially static display 180 displays a clock or other status information that is continually updated. One possible implementation of this technique is now described in reference to FIG. 6.

Figure 6:
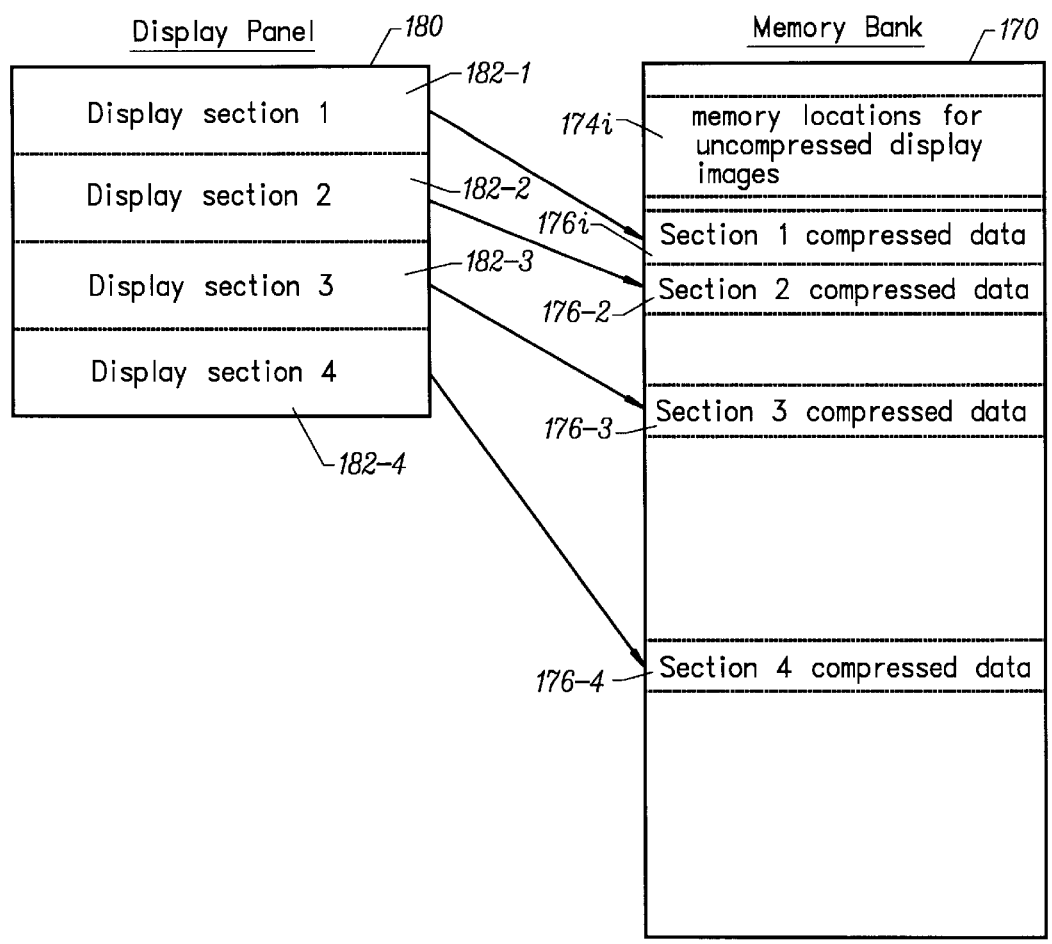
FIG. 6 is a representation of the memory allocation and display areas for a preferred embodiment wherein the memory and the display are segmented.

Referring to FIG. 6, there is shown an illustrative representation of the display panel 180 and the memory bank 170 wherein the display panel 180 has been subdivided into plural display sections 182-1, 182-2, 182-3, 182-4. In this implementation the memory 170 includes a respective set of uncompressed and compressed data locations for uncompressed and compressed data 174-i, 176-j, corresponding to the display sections 182. When this memory organization is employed, the start and end address 258, 260 of each of the compressed data locations is stored in the control registers 206 (FIG. 3). The image data for each display section 182 is then individually handled according to the system flow described in reference to FIG. 5. For example, the image data for the display section 182-4 is compressed or not independently of the status of the other display sections 182.

The number of sections 182 into which the display 180 can be subdivided is not fixed. Theoretically, using a greater number of sections should improve power savings for those situations in which only a very small portion segment of the display is updated. However, too much segmentation will result in efficiency due to the need to determine how the image in each of the segments has changed for each frame. The optimal number of segments (defined as the number of segments that provides the greatest power savings, on average) is a function of the size of the display panel 180 and the power-saving and memory bus bandwidth goals of the target system.

Display activity consumes a significant amount of overall system activities. Display activity also demands the highest priority among other system activities with only a few exceptions, such as low battery condition activities. The higher the display resolution and the greater the number of display colors, the greater the percentage of memory bus bandwidth taken up by display operations. Taken together, these factors dictate that a substantial portion of system bandwidth and processing power are allocated to display activities, which limits system performance for other activities. Thus, reducing the bus demands of display activities without sacrificing either display quality or the responsiveness of the display system improves the performance of other system operations. This is a significant benefit provided by the present invention.

While the present invention has been described with reference to a few specific embodiments, the description is illustrative of the invention and is not to be construed as limiting the invention. For example, the present invention is applicable to any system where high frequency data is repeatedly transferred from a memory to a separate processing unit and is likely to be repeated in the absence of some kind of related activity. Various modifications may occur to those skilled in the art without departing from the true spirit and scope of the invention as defined by the appended claims.

What is claimed is:

1. A data interface system, comprising:
    a processing unit configured to receive input data from a memory and generate from the received input data corresponding output data;
    an uncompressed version of the input data, which is stored in the memory; and
    a compressed version of the input data, which is stored in the memory;
    such that:
        the processing unit is configured, when the input data has not been recently updated, to generate the compressed version from the uncompressed version and to generate the output data from the compressed version; and
        the processing unit is configured, when the input data has been recently updated, to use at least a subset of the uncompressed version to generate the output data.

2. The system of claim 1, further comprising:
    an activity monitor configured to determine whether the input data has been recently updated and to communicate the determination to the processing/control unit, which uses the determination to generate the output data from an appropriate combination of the input data versions.

3. The system of claim 1, wherein, when any part of the input data is updated, the processing unit is configured to generate the output data using the uncompressed version in its entirety.

4. The system of claim 1, wherein the compressed version is structured so that distinct regions of the input data are represented in the compressed version by respective compressed regions; such that, when one or more of the distinct regions are updated, the processing unit is configured to generate the output data using the uncompressed regions that correspond to the updated distinct regions and the compressed regions that correspond to the distinct regions that were not updated.

5. The system of claim 1, wherein the input data is transferred between the memory and the processing unit over a bus.

6. The system of claim 1, wherein transferring the uncompressed version instead of the compressed version frees up additional memory bus bandwidth for unrelated system operations.

7. The system of claim 6, wherein transferring the compressed version over a bus dissipates less power than transferring the uncompressed version over the bus.

8. The system of claim 7, wherein the processing unit, memory and bus are deployed within a computer system with limited power reserves.

9. The system of claim 8, wherein the computer system comprises a handheld device, a portable device, a battery-power device, or any other device that utilizes/demands a continuous and sometimes repetitive incoming data stream.

10. The system of claim 1, wherein the input data is display/video data, the processing unit performs text/graphical/video display operations and the output data is text/graphics/video data.

11. The system of claim 10, further comprising:
    an activity monitor configured to determine whether the display/video data has been recently updated and to communicate the determination to the processing unit, which uses the determination to generate the text/graphics/video data from an appropriate set of the input data versions.

12. The system of claim 10; wherein, when any part of the display video data is updated, the processing unit is configured to generate the text/graphics/video data using the uncompressed version in its entirety.

13. The system of claim 10, wherein the compressed and uncompressed versions are structured so that one or more parts of the display/video data corresponding to respective groups of contiguous text/graphics/video data are represented in the versions by corresponding data regions; such that the processing unit is configured to generate the text/graphics/video data using uncompressed regions corresponding to updated parts of the display/video data and compressed regions corresponding to un-updated regions of the display/video data.

14. The system of claim 10, wherein the compressed version is compressed using a compression method selected from a plurality of methods including at least one of the following:

run length encoding (RLE);

JPEG (joint photographic experts croup); and

MPEG (motion picture experts group).

15. The system of claim 1, wherein the input data is any type of data that must be transferred repeatedly and continuously by the processing unit to and from a second processing unit.

16. The system of claim 1, further comprising:

a hardware compression and decompression engine configured to improve power savings and enhance performance of the system by assisting the processing unit to generate the compressed version by compressing the uncompressed version and to generate the output data by decompressing the compressed version.

17. A data interface method, comprising the steps of:

receiving input data from a memory;

determining whether the input data has been recently updated;

generating, when at least a subset of the input data has not been recently updated, a compressed version of the subset of the input data; and generating, as long as the subset is not subsequently updated, corresponding output data from the compressed version of the subset.

18. The method of claim 17, further comprising the step of:

generating output data for regions of the input data which have been recently updated from corresponding uncompressed input data.

19. The method of claim 18, further comprising the step of storing the compressed version in the memory for use in subsequent display operations; wherein the receiving step comprises:

receiving the compressed version for the subset not recently updated; and receiving the uncompressed input data for the regions recently updated.

20. The method of claim 19, wherein the input data is received over a bus.

21. The method of claim 20, wherein receiving the input data formed as a combination of the compressed version and the uncompressed version frees up additional memory bus bandwidth for unrelated system operations.

22. The method of claim 19, wherein receiving the compressed version over a bus dissipates less power than receiving the corresponding subset of the uncompressed input data.

23. The method of claim 17, further comprising the steps of:

discontinuing the step of generating the compressed version when the size of the compressed version exceeds a predetermined percentage of the size of the subset of the input data and instead generating the corresponding output data from the subset of the input data.

24. The method of claim 17, wherein, when the subset of the input data not recently updated comprises less than 100% of the input data; the output data generating step comprises generating the output data directly from the input data.

25. The method of claim 17, wherein the compressed version is structured so that distinct regions of the input data are represented in the compressed version by respective compressed regions; such that, when one or more of the distinct regions are updated, the output data is generated using the uncompressed regions that correspond to the updated distinct regions and the compressed regions that correspond to the distinct regions that were not updated.

26. The method of claim 17, wherein the input data is display/video data and the output data is text/graphics/video data.

27. The method of claim 26, wherein, when the subset of the display/video data not recently updated comprises less than 100% of the display/video data; the output data generating step comprises generating the text/graphics/video data directly from the display/video data.

28. The method of claim 26, wherein the compressed version is structured so that distinct regions of the display/video data are represented in the compressed version by respective compressed regions; such that, when one or more of the distinct regions are updated, the text/graphics/video data is generated using the uncompressed regions that correspond to the updated distinct regions and the compressed regions that correspond to the distinct regions that were not updated.

29. The method of claim 26, wherein the compressing step comprises compressing the input data using a compression method selected from a plurality of methods including at least one of the following:

run length encoding (RLE);

JPEG (joint photographic experts group); and

MPEG (motion picture experts group).

30. The method of claim 17, wherein the input data is any type of data that must be transferred repeatedly and continuously by a display processor to and from a second processing unit.

31. The method of claim 17, wherein:

the step of generating the compressed version includes compressing in hardware the subset of the input data; and the step of generating the output data includes decompressing in hardware the compressed version of the subset.

* * * * *